United States Patent
Beylin et al.

(10) Patent No.: US 10,766,332 B2
(45) Date of Patent: Sep. 8, 2020

(54) "AFW-5" SUSPENSION FOR A MEANS OF TRANSPORTATION

(71) Applicants: Georgiy Volodymyrovych Beylin, Kiev (UA); Sergiy Yuriiovich Petrenko, Kiev (UA)

(72) Inventors: Georgiy Volodymyrovych Beylin, Kiev (UA); Sergiy Yuriiovich Petrenko, Kiev (UA)

(*) Notice: Subject to any disclaimer, the term of this patent is extended or adjusted under 35 U.S.C. 154(b) by 2 days.

(21) Appl. No.: 16/073,825

(22) PCT Filed: Nov. 14, 2016

(86) PCT No.: PCT/UA2016/000134
§ 371 (c)(1),
(2) Date: Jul. 30, 2018

(87) PCT Pub. No.: WO2018/088984
PCT Pub. Date: May 17, 2018

(65) Prior Publication Data
US 2019/0030977 A1 Jan. 31, 2019

(51) Int. Cl.
*B60G 21/04* (2006.01)
*B60G 3/20* (2006.01)
(Continued)

(52) U.S. Cl.
CPC .............. *B60G 21/04* (2013.01); *B60G 3/18* (2013.01); *B60G 3/20* (2013.01); *B60G 21/023* (2013.01);
(Continued)

(58) Field of Classification Search
CPC .... B60G 21/04; B60G 3/18; B60G 2204/143; B60G 2204/20
(Continued)

(56) References Cited

U.S. PATENT DOCUMENTS 1,437,911 A * 12/1922 Rawson ............... B60G 99/002
280/104
3,504,928 A * 4/1970 Reimer .................... B60G 9/02
280/104
(Continued)

FOREIGN PATENT DOCUMENTS

UA 92122 U 6/2014
UA 92122 7/2014
(Continued)

*Primary Examiner* — Paul N Dickson
*Assistant Examiner* — Hilary L Johns
(74) *Attorney, Agent, or Firm* — Delio Peterson & Curcio LLC; Thomas E. Ciesco

(57) ABSTRACT

The invention relates to structural components of vehicles, and more particularly to the suspension of both conventional and special vehicles, such as ambulances, baby carriages and wheelchairs. The suspension comprises a quadrangular frame with a pair of arms attached thereto, where the ends of said arms are configured to be connected to the hubs of the respective wheels, and the suspension of the present invention comprises two pairs of arms—a pair of identical transverse arms and a pair of identical longitudinal arms with the ends of the longitudinal arms configured to be connected to the hubs of the respective wheels, wherein each arm is rotatably attached by its central zone to the central portion of the corresponding side of a quadrangular frame through rubber-metal joint, wherein the arms contact surfaces are cylindrical, they are adapted for mechanical coupling of arms to each other and are oriented as follows: longitudinal left and right arms have their contact surfaces oriented upwards, while transverse front and back arms have their contact surfaces oriented downwards, contact surfaces of each arm are tangent to the plane extending through the axis of rotation of the arm and are located on one side of it, while each side of the quadrangular frame rests upon the hubs of two wheels through the corresponding arm. Each (Continued)

Figure 1:
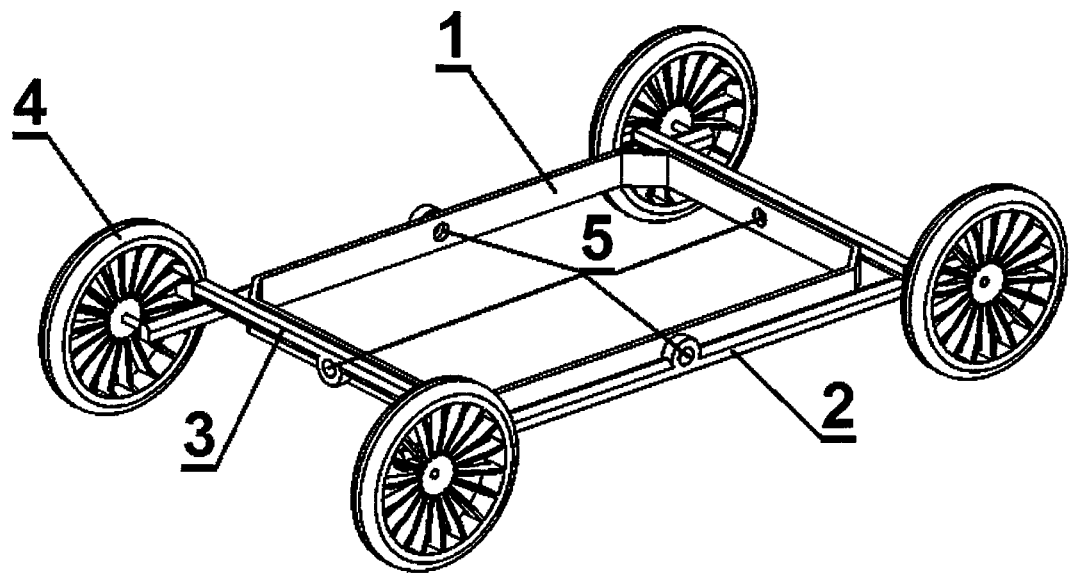

transverse and longitudinal arm is made as a pair of arms spaced apart and connected by at least one connecting rod, and each such spaced arm has the form of a parallelogram. The invention is based on the objective to provide the suspension, which is more reliable due to lower level of mechanical stresses in the suspension mechanisms, which results from creation of the conditions where the function of the mechanism for changing the direction of rotation is performed by a transverse arm having a length equal to the width of the suspension.

1 Claim, 7 Drawing Sheets

(51) Int. Cl.
*B60G 21/02* (2006.01)
*B60G 3/18* (2006.01)

(52) U.S. Cl.
CPC ...... *B60G 21/026* (2013.01); *B60G 2204/143* (2013.01); *B60G 2204/20* (2013.01); *B60G 2204/421* (2013.01); *B60G 2300/07* (2013.01)

(58) Field of Classification Search
USPC .......................................................... 280/788
See application file for complete search history.

(56) References Cited

U.S. PATENT DOCUMENTS

| 4,903,974 | A | * | 2/1990 | Frink | B62D 21/186 180/253 |
| 5,547,207 | A | * | 8/1996 | Madler | B60G 11/08 180/24.08 |
| 8,083,242 | B2 | * | 12/2011 | Brazier | B60G 21/04 180/9.1 |
| 8,262,101 | B2 | * | 9/2012 | Madler | B60G 21/023 180/24.11 |
| 8,317,208 | B2 | | 11/2012 | Bird | |

FOREIGN PATENT DOCUMENTS

| UA | 108091 | 6/2016 | |
| WO | WO-9002072 A1 * | 3/1990 | ............. B60G 21/04 |

* cited by examiner

"AFW-5" SUSPENSION FOR A MEANS OF TRANSPORTATION

The present invention relates to structural components of vehicles, and more particularly to suspension of both usual cars and special higher comfort vehicles, such as ambulances, baby carriages and wheelchairs. The proposed suspension is configured to enable automatic road clearance and body tilt adjustment depending on the condition of the roadway, the speed of the vehicle and the maneuver being performed.

AFW is an abbreviation of the slogan: "always on four wheels".

Clearance or road clearance is the distance from the ground to the lowest point in the central part of a terrestrial vehicle. Under certain road speed and roadway condition, a motor vehicle steerability depends on the clearance value.

The suspension or spring system of a ground vehicle is a combination of parts, assemblies and mechanisms that play the role of a connecting link between the ground vehicle body and the road.

In the present application the motion parts are the wheels of the ground vehicle.

In terms of a number of the essential features, the closest analogue of the present invention is a vehicle suspension comprising a quadrangular frame with a pair of arms attached thereto, where the ends of said arms are configured to be connected to the hubs of the respective wheels [Patent for Utility Model No. 108091, Ukraine, IPC (2016.01) B60G17/0165 (2006.01), B60G 21/05 (2006.01), B60G 11/00; Public. 24.06.2016, bul. #12]. To operate in a usual mode, the described suspension, in addition to the above features, contains a mechanism for changing the direction of rotation, i.e. a gearbox with a differential.

The described suspension ensures constant uniform distribution of the vehicle weight among all four wheels (constant coefficient of traction for all wheels), regardless of the roadway curvature, and also enables the body to tilt in the direction of a turn to prevent a skid. It has an adjustable clearance.

However, such suspension contains highly loaded parts in the mechanism for changing the direction of rotation, which reduces its reliability and limits application, for example, in ambulances.

The proposed invention aims to provide a more reliable suspension of a vehicle. This objective is achieved by way of reducing the level of mechanical stresses in the suspension mechanisms by creating conditions where the function of the mechanism for changing the direction of rotation is performed by a transverse arm having a length equal to the width of the suspension.

Similar to a vehicle suspension of the prior art, the suspension of the present invention comprises a quadrangular frame with a pair of arms attached thereto, where the ends of said arms are configured to be connected to the hubs of the respective wheels, and the suspension of the present invention comprises two pairs of arms—a pair of identical transverse arms and a pair of identical longitudinal arms with the ends of the longitudinal arms configured to be connected to the hubs of the respective wheels, wherein each arm is rotatably attached by its central zone to the central portion of the corresponding side of a quadrangular frame through rubber-metal joint, wherein the arms contact surfaces are cylindrical, they are adapted for mechanical coupling of arms to each other and are oriented as follows: longitudinal left and right arms have their contact surfaces oriented upwards, while transverse front and back arms have their contact surfaces oriented downwards, contact surfaces of each arm are tangent to the plane extending through the axis of rotation of the arm and are located on one side of it, while each side of the quadrangular frame rests upon the hubs of two wheels through the corresponding arm.

A feature of the suspension according to the invention is that each transverse and each longitudinal arm is made as a pair of arms spaced apart and connected by at least one connecting rod, and each such spaced arm has the form of a parallelogram.

Also, a feature of the suspension according to the invention is that each connecting rod is equipped with a damper and a linear actuator.

Also, a feature of the suspension of the invention is that at least one pair of parallel sides of the quadrangular frame has movable inserts equipped with linear actuators.

The suspension of the invention consists of a quadrangular frame, a pair of identical longitudinal arms and a pair of identical transverse arms. Wheel hubs are attached to the ends of the longitudinal arms. The longitudinal and transverse arms have a symmetrical design with an opening in the center and are attached to the quadrangular frame by rubber-metal joints. The arms are located in a plane, which is parallel to the roadway, and they have contact surfaces of a cylindrical form for mechanical coupling of arms to each other and are oriented as follows: longitudinal left and right arms have their contact surfaces oriented upwards, while transverse front and back arms have their contact surfaces oriented downwards. The contact surfaces of one arm are tangent to the plane extending through the axis of rotation of the arm and are located on one side of it. Each side of the frame rests upon two wheels through the corresponding arm. Such orientation of the arms enables to transfer a vehicle weight to four wheels simultaneously and to monitor the position of the body when moving over rough terrain.

To expand the suspension applications, it is proposed to use split arms with connecting rods and movable (front and rear) frame inserts with moving mechanisms, i.e. linear actuators. Such solution enables to adapt the suspension virtually to any size of the vehicle frame and to adjust the clearance and tilt. Split arms are made in the form of a parallelogram to preserve the principle of the suspension operation and to enable changes of the wheel track width. The longitudinal and transverse split arms are connected by an angular element, which holds a knuckle in the vertical position at different angles of the arms location. Connecting rods (linkage rods) are equipped with dampers and mechanisms for changing the length, i.e. linear actuators. The linkage rod dampers serve for absorbing shocks of the minor roughness of the road surface by the suspension, and the linear actuators allow to change the clearance and tilt of the vehicle body. Moving the movable (front and rear) frame inserts with the transverse split arms attached thereto by linear actuators changes the distance between the wheels of one axis, i.e. the wheel track.

At the time of patent information research performed in the process of the present application preparation the authors have not revealed any vehicle suspensions possessing the above mentioned set of essential features, which proves that the claimed technical solution complies with "novelty" patentability criterion.

The technical result obtained as a result of the implementation of the proposed invention is the possibility of suspension adaptation to the width of wheel track due to using split arms in the structure, where each of said arms is made in the form of a parallelogram, which allows to reduce the level of mechanical stress in the suspension components during vehicle turns, movement over the rough terrain, and increases the reliability of the suspension.

The authors have not revealed the indicated technical result in the known technical solutions of the prior art, therefore the proposed suspension may be deemed to comply with the "inventive step" patentability criterion.

The proposed vehicle suspension consists of structural elements, which may be manufactured using presently known technological methods, means and materials. It can be used in ground vehicles in different sectors of economy, therefore it is possible to conclude that the proposed solution complies with "industrial applicability" patentability criterion.

Figure 2:
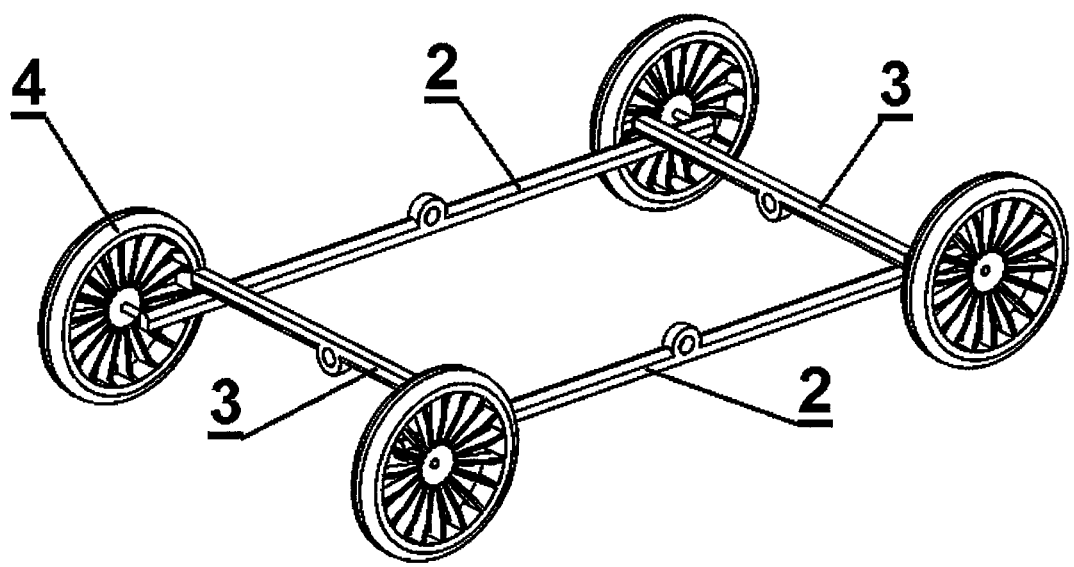
Figure 3:
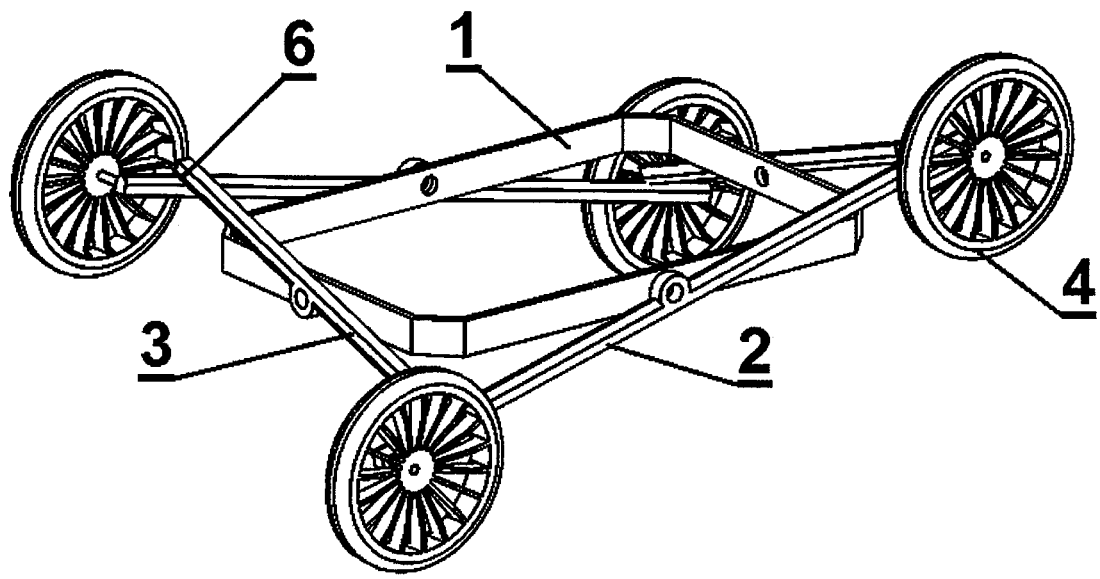
Figure 4:
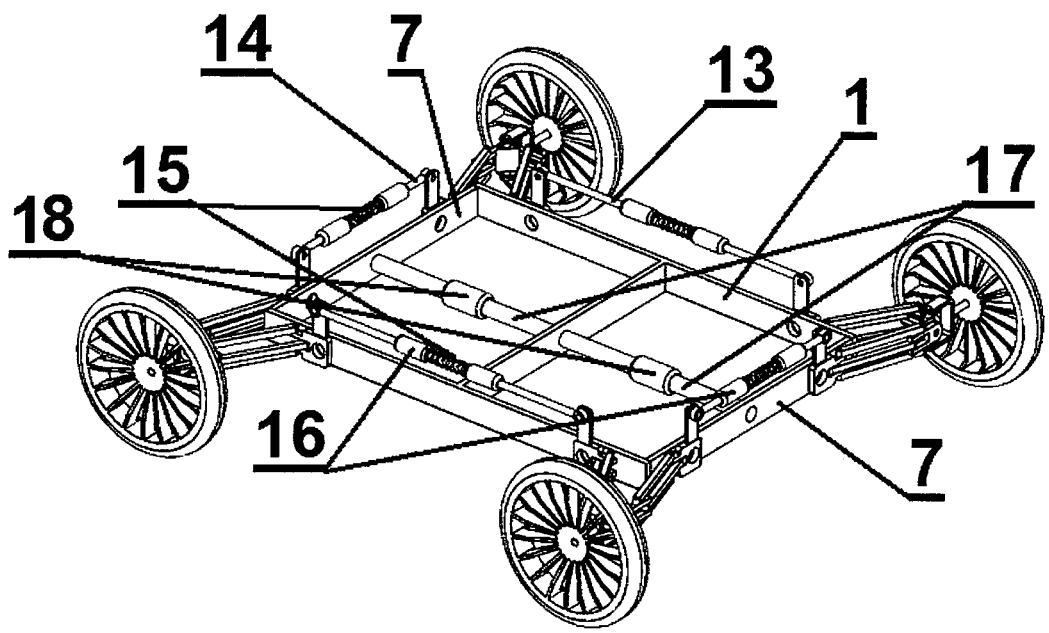
Figure 5:
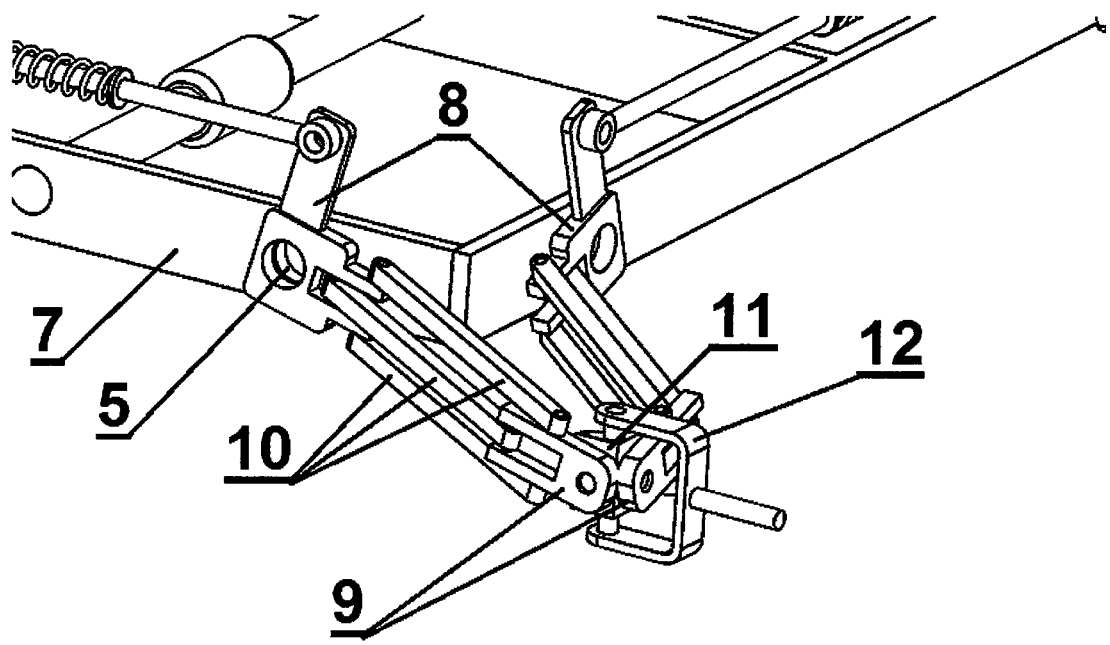
Figure 6:
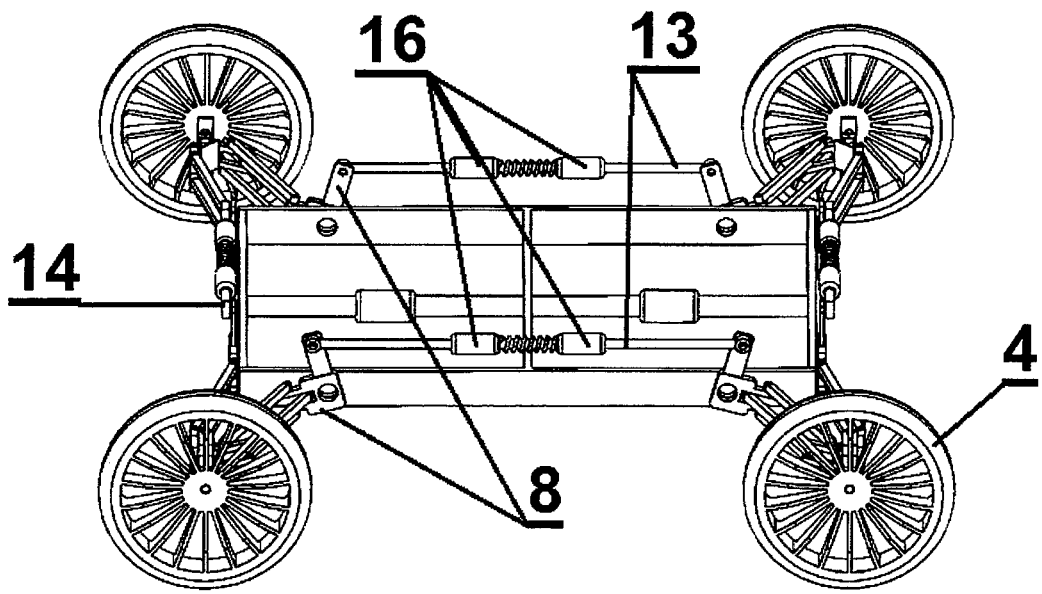
Figure 7:
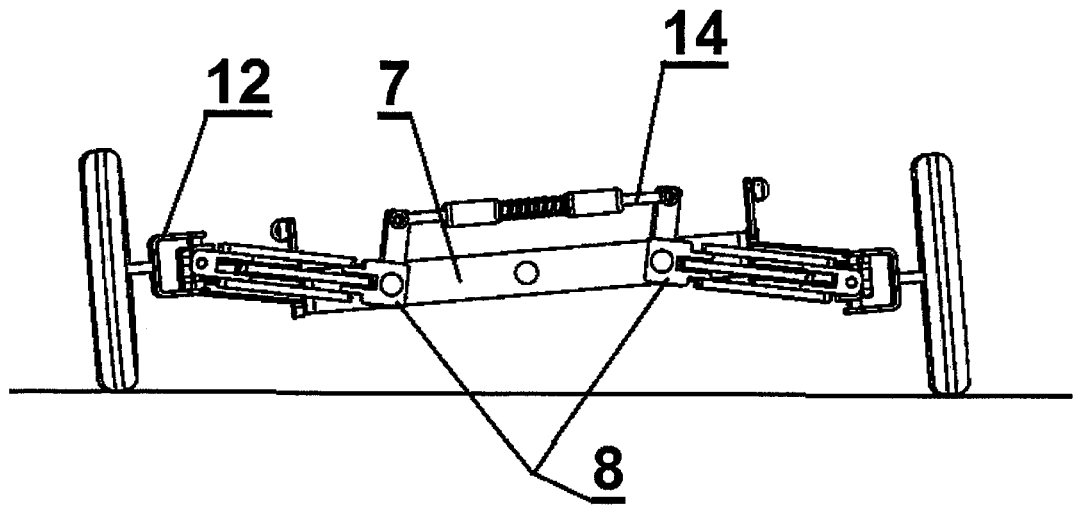
Figure 8:
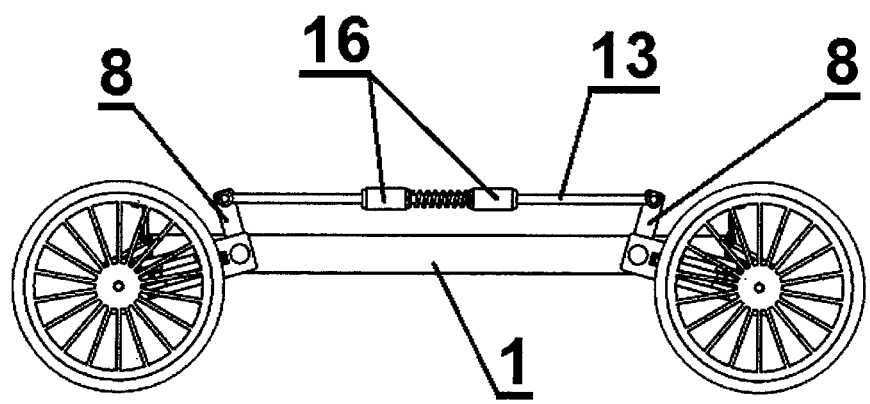
Figure 9:
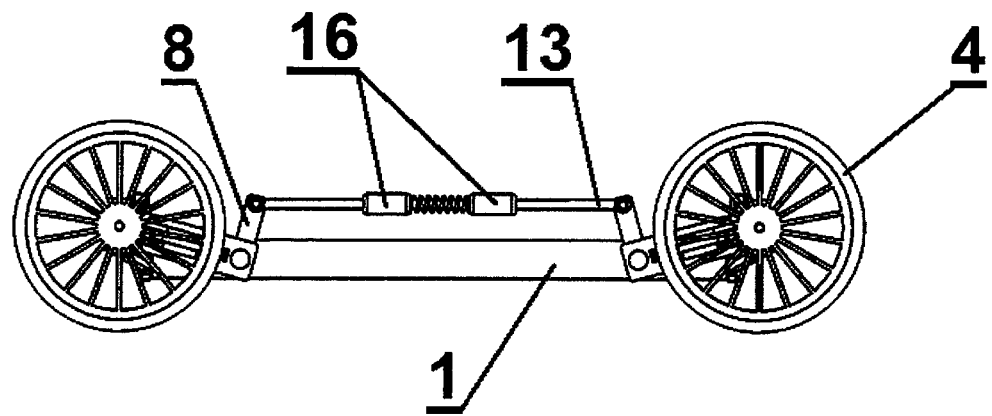
Figure 10:
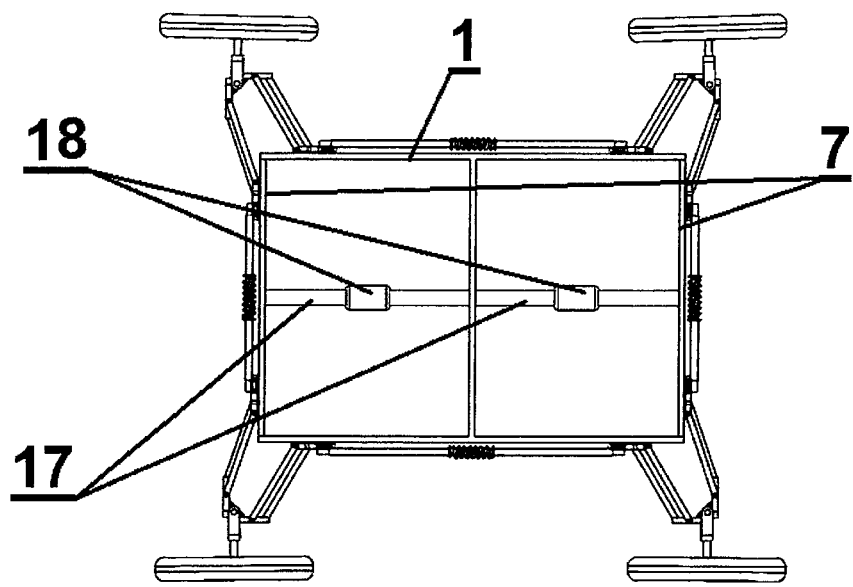
Figure 11:
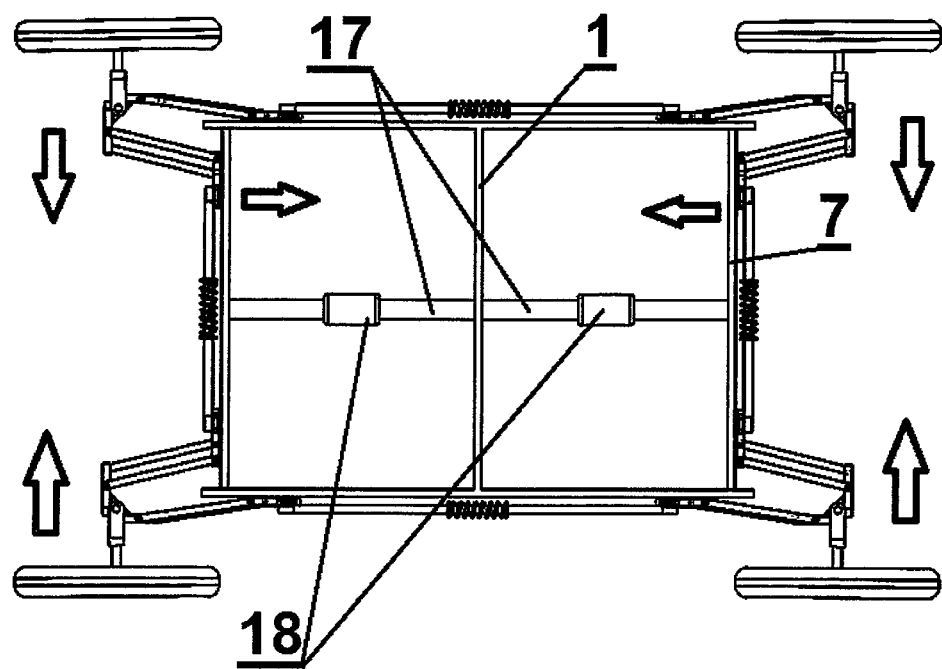
Figure 12:
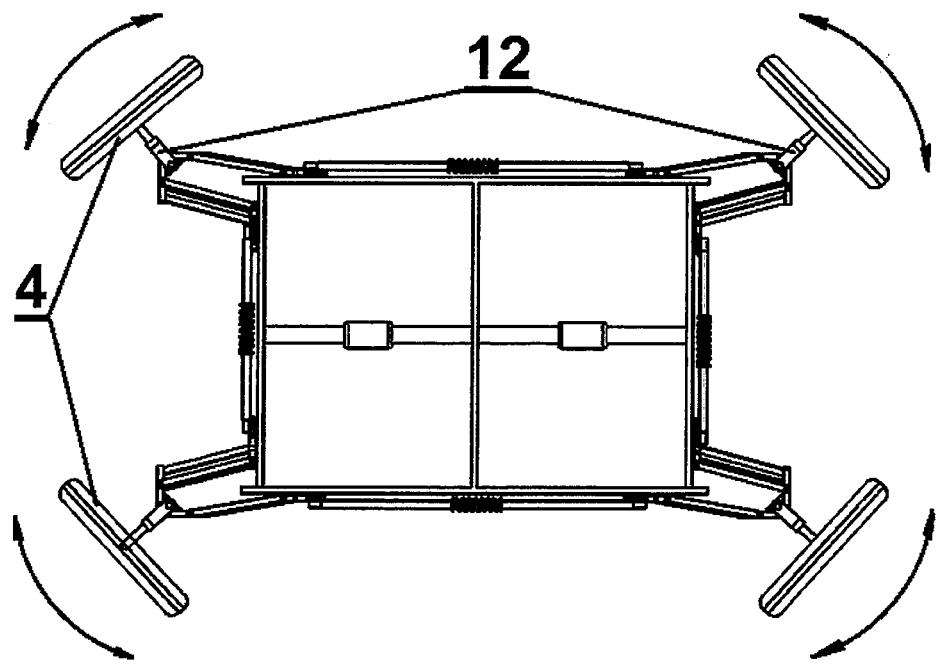
Figure 13:
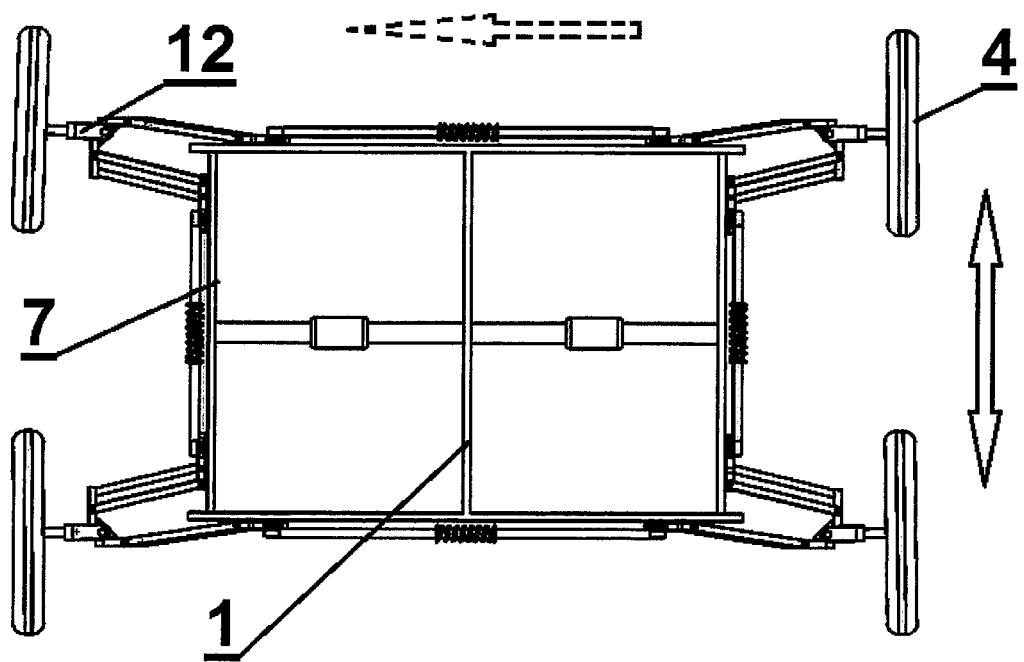

The essence of the invention is further explained by the drawings, where:

FIGS. 1 and 2 is a general view of the suspension AFW-5,
FIG. 3 illustrates the operation of the suspension arms,
FIG. 4 is a general view of the suspension with split arms,
FIG. 5 shows the structure of a split arm,
FIGS. 6, 7 show body tilt,
FIGS. 8, 9 show clearance change,
FIGS. 10, 11 show the change of wheel track width, and
FIGS. 12, 13 shows wheels rotation for different motion directions.

The vehicle suspension AFW-5 according to the invention (FIGS. 1, 2, 3) consists of a rectangular frame 1, two longitudinal arms 2, two transverse arms 3, wheels 4 and rubber-metal joints 5 (shown schematically). The longitudinal arm 2 and the transverse arm 3 have cylindrical form in the contact zone 6. To expand the suspension applications, the frame 1 is complemented by the movable inserts 7 (FIG. 4), and each longitudinal arm 2 and each transverse arm 3 is made as a pair of arms spaced apart. Each spaced arm consists of a rocker 8, a plate 9, rods 10, an angular element 11 and a knuckle 12 (FIG. 5). The rockers 8 of each longitudinal and transverse spaced arms are connected by a connecting rod 13 and 14, respectively. A damper 15 and at least one linear actuator 16 are mounted on each connecting rod 13 and 14. The movable inserts 7 are movably attached to the frame 1 by supports 17 and are driven by linear actuators 18 (FIG. 4). The suspension is also provided with a conventional steering mechanism (not shown), a control system (not shown) for controlling the linear actuators 16 and 18. The control system contains an on-board computer and sensors to sense speed, steering position, as well as acceleration and tilt of the frame (not shown). The outputs of the speed, steering position, acceleration and frame tilt sensors are connected to the corresponding inputs of the on-board computer, and the outputs of the on-board computer are connected to the drives of the linear actuators 16 and 18 (not shown). The on-board computer may be a usual industrial controller with the appropriate software.

The vehicle suspension AFW-5 according to the invention operates as follows.

At the assembling stage, for proper operation of the suspension, the transverse arms 3 are mounted over the longitudinal arms 2 to ensure their contact 6. The length of the connecting rods 13 is adjusted according to the readings of the acceleration and tilt sensors obtained via the on-board computer (not shown) by way of changing the length of the linear actuators 16. Due to gravity the vehicle suspension self-aligns and evenly distributes its weight among four wheels, being four points of support (FIGS. 1, 2, 3). The longitudinal arms 2 and the transverse arms 3 can freely rotate during the movement of the vehicle due to the rubber-metal joints 5 (shown schematically), when a wheel 4 of one of the axles rolls over an obstacle. This leads to a change in the position of the longitudinal arms 2 and transverse arms 3 and also to a change in the spatial position of the frame 1, which results in the vehicle suspension self-aligning by gravity and even distribution of its weight among four wheels. In this case, the frame 1 takes the position of the averaged plane for the four points of contact of the wheels 4. The suspension maintains its operational capacity while the longitudinal arms 2 and transverse arms 3 are in contact (engagement) (the contact zone 6 is shown in FIG. 3).

The suspension overcomes small obstacles due to the springing properties of the longitudinal 2 and transverse 3 suspension arms and metal-rubber joints 5 (FIGS. 1, 5).

The use of the spaced longitudinal 2 and transverse 3 arms, rocker 8, plate 9, rods 10 of the suspension (FIG. 5) makes it possible to maintain the spatial parallelism of the axis of the rocker 8 and the axis of the plate 9 at any of their mutual positions (FIG. 5). Two spaced composite arms, such that one is fixed on the frame 1 and the other is attached to the insert 7, are connected by the angular element 11 and maintain the axis of the knuckle 12 at a constant angle to the plane of the frame 1, which enables to increase the vehicle steerability, to reduce the level of mechanical stress in the suspension components during vehicle turns, movement over the rough terrain, and to increase the reliability of the suspension.

By changing the position of the insert 7 relative to the frame 1, i.e. by reducing the length of the supports 17 using the linear actuators 18, the distance between the wheels 4 of one axis, i.e. wheel track is defined (FIGS. 10, 11).

While the nominal length of the connecting rods 13 is observed when the vehicle is in the horizontal position, deviation from said nominal length of the longitudinal connecting rods 13 (the decrease of the right rod length with equal increase of the left rod length and vice versa) connecting the split arms 2 and 3 allows tilting of the vehicle frame 1 to the right or to the left in order to compensate for the slope of the roadway, to allow passengers to exit from the vehicle or to pass a turn. In this context, in order to tilt to the right, it is necessary to reduce the right rod length and increase the left rod 13 length by equal amount and vice versa, to tilt to the left, it is necessary to reduce the left rod length and increase the right rod 13 length by the same amount.

The vehicle suspension of the invention can change the road clearance. A synchronous and pairwise identical change in the length of the linear actuators 16 of the longitudinal and transverse linkage rods 13, 14 increases or decreases the suspension's clearance.

The wheels 4 mounting makes it possible to realize additional possibilities in maneuvering, for example as shown in FIG. 12, 13.

Based on the suspension AFW-5 it is possible to design:
baby carriages and motorized wheelchairs,
hospital wheelchairs and beds with a function of lateral tilt for comfortable moving a patient or movement along the slope,
passenger cars with both conventional internal combustion engines (ICE) and electric motors. The use of the suspension AFW-5 in a passenger car gives a significant saving of materials (up to 20% by weight) due to the use of a flat bearing structure. Passing the turns with body tilt is easily implemented as well (like in case of a motorcycle).
a quadramaran, a golf cart, a dolly, a lunar rover and the like.

Support on all four wheels (uniform and constant weight distribution) is achieved without the use of spring elements, but only due to the connection of all the wheels 4 with each other and the gravity.

Suspension is fully operational with four wheels 4 of different diameters.

LIST OF ITEMS IN THE DRAWINGS

1—rectangular frame,
2—longitudinal arm,
3—transverse arm,
4—wheel,
5—rubber-metal joint,
6—contact zone of arms,
7—movable insert,
8—rocker,
9—plate,
10—rod,
11—angular element,
12—knuckle,
13, 14—connecting rods,
15—damper,
16—linear actuator of a connecting rod,
17—support,
18—linear actuator of the movable insert.

The invention claimed is:

1. A vehicle suspension comprising a quadrangular rigid frame (1) with longitudinal arms (2) rotatably attached to a right and to a left side thereof, wherein ends of said longitudinal arms are designed to connect to a respective hub of a corresponding wheel (4), the suspension further comprising two transverse arms (3) rotatably fixed at a front and at a rear of the frame, characterized in that the transverse arms (3) are located above the longitudinal (2) arms and in sliding contact with the longitudinal arms, wherein vertical movement of the end of one arm results in the movement of all the other arms, the arms at the point of sliding contact (6) with each other have cylindrical surfaces to ensure contact in the entire range of movements, and configured to redistribute a weight of the frame (1) through the longitudinal arms (2) and the wheel hubs (4) directly and through the transverse arms (3) to the longitudinal arms (2) and the wheel hubs.

\* \* \* \* \*